Feb. 9, 1937.  R. DUFOUR  2,070,475
SPARK GAP APPARATUS
Filed Jan. 8, 1936  2 Sheets-Sheet 1

Inventor:
René Dufour
Attorneys:
Bailey & Parson

Feb. 9, 1937. R. DUFOUR 2,070,475
SPARK GAP APPARATUS
Filed Jan. 8, 1936 2 Sheets-Sheet 2
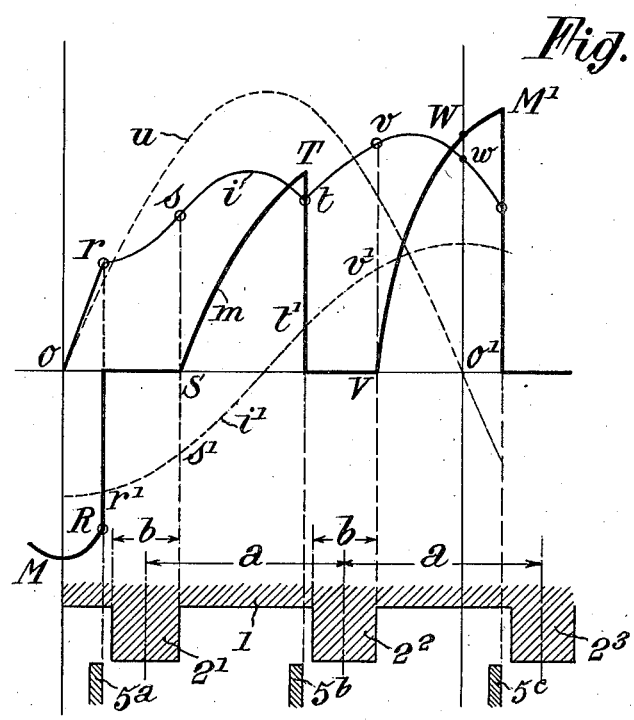
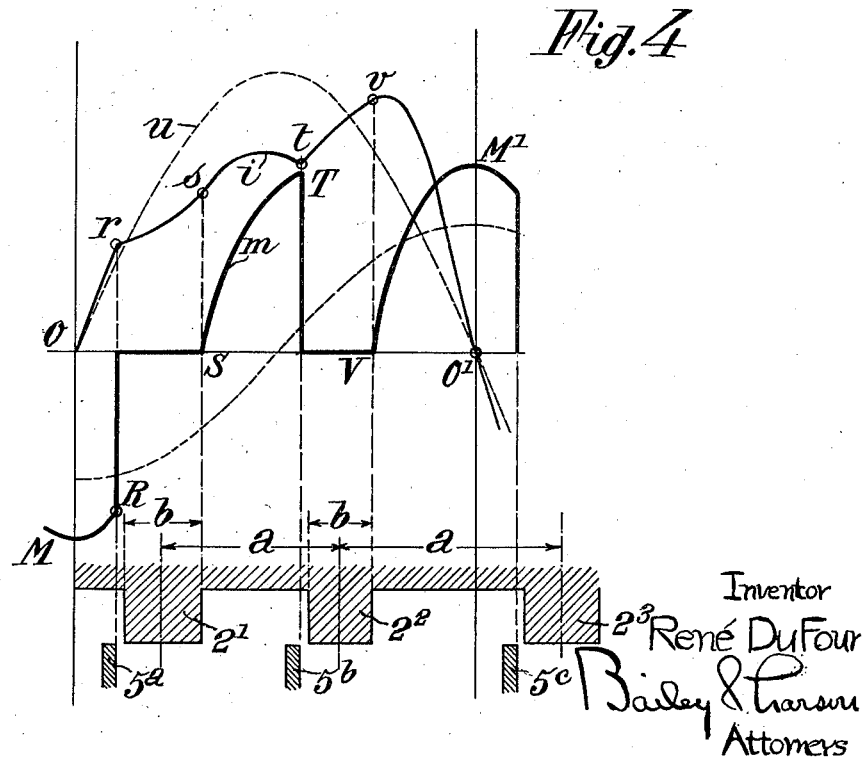
Inventor
René DuFour
Bailey & Larson
Attorneys Patented Feb. 9, 1937

2,070,475

UNITED STATES PATENT OFFICE 2,070,475

SPARK GAP APPARATUS

René Dufour, Paris, France

Application January 8, 1936, Serial No. 58,189
In Luxemburg, January 10, 1935

9 Claims. (Cl. 250—38)

The present invention relates to spark gap apparatus.

The object of the invention is to provide an apparatus of this kind which has an improved efficiency and the operation of which is smoother, more reliable, and capable of being mathematically calculated.

According to the essential feature of the present invention, this apparatus, which includes a rotary electrode, adapted to be charged in an intermittent manner and to cooperate with a stationary or movable electrode, is provided, on the periphery of said rotary electrode, with teeth or projections the positions and dimensions of which are so chosen that the intensity of the current that charges said rotary electrode can comply with some predetermined conditions, for instance periodically to become equal to zero at the same time as the feed tension.

According to another feature of the present invention, each of the teeth or projections of the rotary electrode of the device is given a sufficient angular width in order that, when said tooth or projection moves opposite the other electrode, there may be obtained a practically complete discharge of said rotary electrode.

According to still another feature of the present invention, which relates more especially to the means provided in connection with the apparatus for blowing out the sparks when the discharge is nearly finished, these means are arranged in such manner that the direction of the blast jet produced by said means in order to blow out the spark is substantially in line with the direction of said spark when the latter is going to be blown out.

Other features of the present invention shall result from the following detailed description of some specific embodiments thereof.

A preferred embodiment of the present invention will be hereinafter described with reference to the accompanying drawings, given merely by way of example and in which:

Figs. 3 and 4 show two graphs relative respectively to the operation of a spark gap of which the movable electrode carries projections or teeth constructed in the usual manner and of a spark gap constructed according to the invention.

The spark gap apparatus that will now be described with reference to the drawings is, for example, of the type of those employed in connection with high frequency electric furnaces.

This spark gap apparatus includes a first electrode $1$, which is given the form of a metallic disc provided on its periphery with teeth or projections $2^1$, $2^2$, etc., and which is driven with a rotary motion in the direction of arrow $f$, for instance by an electric motor $3$, said disc rotating about its horizontal axis.

This first electrode $1$ cooperates with a second electrode $5$, either stationary or movable. Advantageously, as shown by the drawings, this second electrode $5$ consists of a metallic disc driven with a rotary motion about its vertical axis, for instance by the same electric motor $3$ and through a transmission including, for instance, a belt $4$, a speed reducer $4^1$, and a flexible shaft $6$.

The electrodes $1$ and $5$ are connected, through cables $1^1$ and $5^1$ respectively, to the terminals of a source of alternating current $7$ (Fig. 2) having a high tension, in a manner that will be hereinafter more explicitly described. The electrodes are adjusted in a relative position such that a gap, preferably adjustable and which may be made very small, remains between electrode $5$ and the free end of each of the teeth $2^1$, $2^2$, etc. of the other electrode $1$ when the tooth in question is passing close to electrode $5$ in such manner that a spark can be produced between said tooth and electrode $5$.

Advantageously, the structure further includes a pneumatic blowout device, preferably comprising one or two blast nozzles $8$ for compressed air or gas, arranged in such manner that the axis of the gaseous jet is as much in line as possible with the direction in which the spark extends when the tooth is moving away from electrode $5$. With this arrangement, the spark is suddenly broken or blown out as soon as the edge of the tooth leaves the level of the upper face of electrode $5$. It should be noted that the axis of the gaseous jet is at right angles to the direction of the spark during the discharge proper and the spark undergoes a sudden variation of direction, by constantly extending between electrodes $1$ and $5$ along the shortest path between said electrodes, only at the end of the discharge. At this time the spark must be blown out and this is the reason for which nozzle or nozzles $8$ occupy a position in which their axes are in a substantially vertical plane, in the case of the example which is considered.

Figure 2:
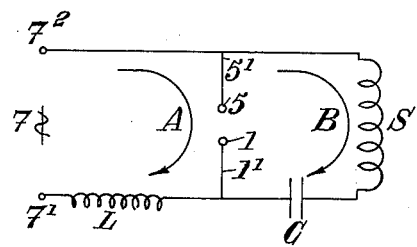
Fig. 2 is a diagram of the electric connections intended to explain the operation of the apparatus according to the invention.

When spark gap apparatus is applied for instance to high frequency electric furnaces, it is often advantageous to employ an electrical arrangement as shown by Fig. 2 in a diagrammatic manner. According to this arrangement, a terminal $7^1$ of the feed source $7$ is connected to electrode $1$ through a reactance coil L, while the other terminal $7^2$ of the same source is connected directly to the other electrode $5$, the whole forming a circuit A. Furthermore, the electrodes $1$ and $5$ are connected together through a circuit B including, on the side of electrode $1$, at least one condenser C separated from electrode 5 by an inductive winding S of suitable value.

Just at the time when a discharge spark formed between electrodes 1 and 5 is going to be blown out, circuit A serves for the passage of the electric current, flowing through coil L and the spark. If this spark is suddenly broken, due to the combined action of the increase of distance between the electrodes and of the blowing means, this current is compelled to flow through circuit B and it charges condenser C while the tooth is moving away from electrode 5. The charge imparted to the condenser depends, for a given apparatus, upon the tension at the terminals $7^1$, $7^2$ when the charging action begins, on the one hand, and upon the intensity of the current in circuit A at the same time, on the other hand. When the next tooth gets close to electrode 5, the condenser discharges, producing a high frequency current in a spark which may be made very short, which contributed in improving the efficiency of the spark gap apparatus.

Furthermore, the angular width of each tooth is sufficient in order that, practically, the condenser, and therefore electrode 1, may be wholly discharged when the tooth moves away from electrode 5 and the spark is blown out by nozzle or nozzles 8.

Figure 1:
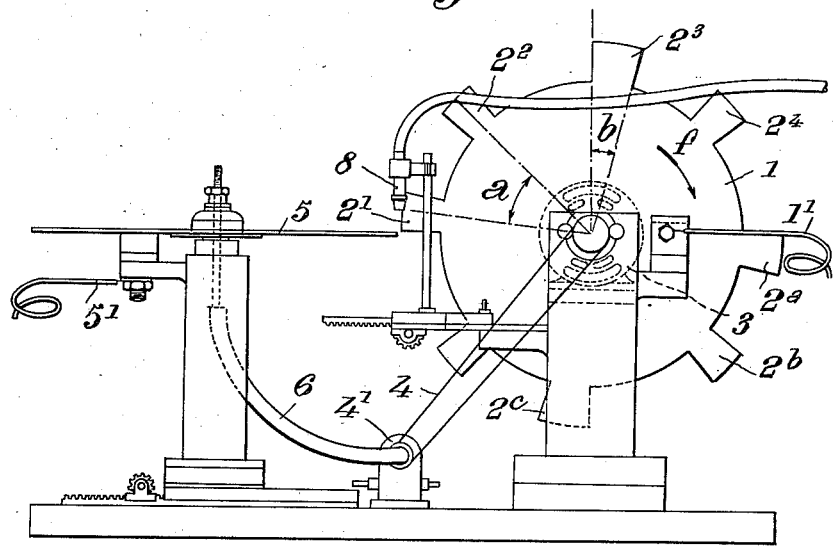
Fig. 1 is an elevational view of a spark gap apparatus made according to the invention.

With a spark gap apparatus which is suitably adjusted, the same phenomenon must be reproduced in an identical manner every half period. Accordingly, it is first necessary that the spark gap apparatus should be synchronized, that is to say electrode 1 must be caused to rotate at the frequency of the feed tension or a sub multiple thereof. The number of teeth that must be provided on electrode 1 depends upon the number of discharges or sparks that it is desired to obtain for every half period. If it is assumed that the high tension applied between terminals $7^1$ and $7^2$ corresponds to a sinusoidal-shaped curve, it is possible, in the case of synchronism properly speaking, to divide the teeth of electrode 1 into two groups, which correspond respectively to two successive half periods of the feed tension. As these half periods are similar (with the difference of the sign) in the particular case that is considered, the two groups of teeth must be identical to each other, that is to say their teeth may occupy analogous relative positions and have the same angular widths respectively. In the case of a synchronous spark gap apparatus, such as that shown by Fig. 1, there exist, consequently, in the two groups, couples of teeth that correspond to each other, such as $2^1$ and $2^a$, the discharges corresponding to the two teeth of such a couple occurring at the same relative times of two successive half periods. In the case of a spark gap apparatus turning in semi-synchronism, that is to say turning through half a revolution for each period of the feed tension, there would be four groups of teeth and four corresponding teeth of the same kind in these four groups, respectively.

On Fig. 3 there has been designated by $a$ the angular distance between two successive teeth and by $b$ the angular width of each tooth of the movable electrode.

Spark gaps are known for which the values $a$ and $b$ are equal for all the teeth of the electrode 1. The diagram, shown on Fig. 3, relates to this known arrangement. It is assumed that the toothed disc 1 of the spark gap turns synchronously with the supply tension and comprises, as for the example according to Fig. 1, two teeth per half-period.

On the diagram of Fig. 3, there has been shown in "development" a part of the periphery of the toothed disc 1 with the teeth $2^1$, $2^2$ and $2^3$ having identical spacings $a$ and widths $b$. This electrode is supposed to be fixed whilst $5^a$, $5^b$ and $5^c$ correspond to three characteristic positions of the electrode 5, supposed to be movable with respect to the electrode 1 and at the moment when the spark is produced between the electrode 5 and one of the teeth of the electrode 1. The sine curve $u$ shown in broken lines corresponds to that of the supply tension to the terminals $7^1$ and $7^2$. The curve $i$ corresponds to the intensity furnished by the feed network and the sine curve $i^1$ to the intensity of the current which would be established in the circuit A (Fig. 2) if the terminals 1 and 5 of the spark gap were constantly in contact, the spark gap offering, in consequence, a zero resistance to the passage of the current. It is known that the curve $i$ is constructed by points with the aid of the formula $$i = C\frac{du}{dt}$$

and that the parts $r$—$s$ and $t$—$v$ of this curve, during the sparking periods, are parallel to the corresponding portions $r^1$—$s^1$ and $t^1$—$v^1$ of the sine curve $i^1$. It has been assumed that the position of the disc 5 with respect to the electrode 1 is such that at the commencement of a certain half-period the intensity $i$ and the tension $u$ are zero simultaneously. $m$ represents the curve corresponding to the tension at the terminals of the spark gap, this tension being zero during the periods when the sparking is produced.

To construct the curve $m$ the following considerations are taken as a basis. At the phase $o$ the curve $m$ presents a minimum at M and the charge intensity $i$ is zero and passes through the point O. This intensity increases according to the curve O$r$ while the tension of the condenser diminishes in absolute value and attains the disruptive value at R for which the first spark flashes. By this fact the tension $m$ becomes zero and the intensity varies during the charge pressure according to the curve $r\ s$ parallel to the portion $r^1$—$s^1$ of the curve of intensities $i^1$. The discharge is terminated at S and a new charge is produced which is terminated at T while the intensity $i$ varies from $s$ to $t$. A second discharge is then obtained which is terminated at V. During a new charge of the condenser its tension $m$ attains a value W at the moment when the tension $u$ at the terminals of the spark gap 7 and $7^1$ is equal to zero, the intensity $i$ having a value O$^1w$. The maximum M$^1$ of the curve $m$ is atained beyond the point W and when tension $u$ and intensity $i$ are different from zero. A displacement is therefore produced between the supply tension $u$ and the intensity $i$ furnished by the network in such a way that the initial conditions such as they exist at the point O are only reproduced fortuitously.

On the contrary, in choosing, according to the diagram shown on Fig. 4, clearly different values of $a$ and $b$ for two consecutive teeth $2^1$ and $2^2$ it is possible to give to the intensity $i$ a value $o$ each time the supply tension $u$ becomes zero, which makes it possible to obtain series of sparks which are always reproduced in the same conditions. In effect, at the point O$^1$ the same electric characteristics (except the sign) are found as at the point O. This particularity according to which the intensity $i$ and the supply tension $u$ have the same period and are both evenly divided into two equal half-periods, can be called "isoperiodicity" and it is essential, as can be proved by experiments and calculations, in order to obtain a good power factor.

It follows that, in order to obtain isoperiodicity, it is necessary that the pitches and/or angular widths of the teeth of one group should be unequal. Such an arrangement is clearly visible in Fig. 1, in which the interval between teeth $2^2$ and $2^3$ is substantially larger than that existing between teeth $2^3$ and $2^4$ and the angular width of teeth $2^3$ and $2^c$ is much larger than that of the other teeth. In order to obtain the suitable pitches and angular widths corresponding to each particular case, account should be taken, among other things, of the number of teeth, the curve of tensions, the curve of the intensities of charge of the condensers, and the variation of the potential at the terminals of the condensers. It is then possible, by means of graphs, to determine the values to be chosen in order that the intensity of the current that serves to charge condenser C may comply with the conditions for obtaining a good power factor (one of these conditions being isoperiodicity) and, for instance, may become equal to zero when the feed tension becomes equal to zero.

I can thus obtain a spark gap apparatus working with a power factor which may be made very nearly equal to one, the discharge of the condensers taking place regularly and completely, with an efficiency as high as possible; furthermore, there are no risks of voltage rises in the whole of the plant as it would be the case with spark gap apparatus having multiple teeth having all the same pitch and angular width, turning with a speed of revolution having no determined relation with the frequency of the feed tension.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:
1. A spark gap apparatus which comprises, in combination, a first electrode, a rotary electrode adapted to cooperate with the first mentioned electrode, means for intermittently charging said second mentioned electrode, and a plurality of teeth carried by said second mentioned electrode, for formation of the spark between the first mentioned electrode and each of said teeth successively, the interval between two successive teeth and the respective angular width of each tooth corresponding to predetermined conditions, at least one of these two values being different for the respective teeth.

2. A spark gap apparatus which comprises, in combination, a first electrode, a rotary electrode adapted to cooperate with the first mentioned electrode, means for applying tension to said electrodes and for intermittently charging said second mentioned electrode, and a plurality of teeth carried by said second mentioned electrode, for formation of the spark between the first mentioned electrode and each of said teeth successively, the values of the interval between two successive teeth and the respective angular width of each tooth being such that the current that feeds said second mentioned electrode becomes periodically equal to zero at the same time as the feed tension of said tension applying means, at least one of the two above mentioned values, being different for the respective teeth.

3. A spark gap apparatus according to claim 1 in which the width of each of the teeth is sufficient in order that, when said tooth moves past the other electrode, a full discharge of said second mentioned electrode is obtained.

4. A spark gap apparatus according to claim 2 in which the width of each of said teeth is sufficient in order that, when said tooth moves past the other electrode, a full discharge of the second mentioned electrode is obtained.

5. A spark gap apparatus according to claim 1 further including at least one blast nozzle for blowing out the spark between said first mentioned electrode and one of the teeth when the spark discharge is substantially finished, said nozzle being directed substantially in line with the direction of the spark when the latter is to be blown out.

6. A spark gap apparatus according to claim 2 further including at least one blast nozzle for blowing out the spark between said first mentioned electrode and one of the teeth when the spark discharge is substantially finished, said nozzle being directed substantially in line with the direction of the spark when the latter is to be blown out.

7. A spark gap apparatus which comprises, in combination, a first electrode having the form of a disc adapted to rotate about a certain axis, a second electrode having the shape of a disc adapted to rotate about an axis at right angles to the first mentioned axis, means for intermittently charging said second mentioned electrode, means for rotating said second mentioned electrode in synchronism with the feed tension of said first mentioned means, and a plurality of teeth carried by the periphery of said second mentioned electrode, for formation of the spark between the first mentioned electrode and each of said teeth successively, the interval between two successive teeth and the angular width of each tooth being different for at least some of the teeth.

8. An apparatus according to claim 7 further including a blast nozzle directed along a line at right angles to the first mentioned disc and located in the plane of the second mentioned disc, for blowing out the spark when the spark discharge is substantially finished.

9. A spark gap apparatus which comprises, a first electrode, a rotary electrode adapted to cooperate with the first electrode, an oscillatory circuit connected in parallel with said electrodes and including a condenser, means to supply alternating current to said electrodes and circuit, said second electrode having teeth on its periphery adapted to form sparks with the first electrode at each half period of the current, the values of the width of the teeth and the distance therebetween being such that the current in the oscillating circuit always reaches the same absolute value when the voltage in the supply means becomes zero, at least some of said values being unequal.

RENÉ DUFOUR.